(12) United States Patent
Xu et al.

(10) Patent No.: US 9,055,469 B2
(45) Date of Patent: Jun. 9, 2015

(54) METHOD AND DEVICE FOR INDICATING MBMS SERVICE SUSPENSION, AND USER EQUIPMENT

(75) Inventors: Hui Xu, Shenzhen (CN); Yijian Shen, Shenzhen (CN); Xiao Du, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/638,774

(22) PCT Filed: Aug. 31, 2011

(86) PCT No.: PCT/CN2011/079184
§ 371 (c)(1),
(2), (4) Date: Oct. 1, 2012

(87) PCT Pub. No.: WO2012/155408
PCT Pub. Date: Nov. 22, 2012

(65) Prior Publication Data
US 2014/0071878 A1 Mar. 13, 2014

(30) Foreign Application Priority Data
May 17, 2011 (CN) .......................... 2011 1 0127688

(51) Int. Cl.
*H04W 28/02* (2009.01)
*H04W 4/06* (2009.01)
(Continued)

(52) U.S. Cl.
CPC ....... *H04W 28/0289* (2013.01); *H04L 12/1863* (2013.01); *H04L 12/189* (2013.01);
(Continued)

(58) Field of Classification Search
USPC ................................................. 370/252, 312
See application file for complete search history.

(56) References Cited

U.S. PATENT DOCUMENTS

2010/0113030 A1* 5/2010 Kanazawa et al. ............. 455/437
2011/0171915 A1* 7/2011 Gomes et al. .................. 455/73
(Continued)

FOREIGN PATENT DOCUMENTS

CN 101170716 A 4/2008
CN 101389087 A 3/2009
(Continued)

OTHER PUBLICATIONS

"Introduction of MCE initiated MBMS Session Start Request"; Alcatel-Lucent et al.; RAN WG3; MBMS_LTE_enh; 3GPP TSG-RAN WG3 Meeting #69bis Xi'an, P.R.China, Oct. 11-15, 2010; R3-103022; XP50496316A.
(Continued)

*Primary Examiner* — Omar Ghowrwal
*Assistant Examiner* — Angel Brockman
(74) *Attorney, Agent, or Firm* — Ling Wu; Stephen Yang; Ling and Yang Intellectual Property

(57) ABSTRACT

A method and system for indicating MBMS suspension and a user equipment are disclosed in the present invention. The method includes: a network side determining an MBMS required to be suspended; and the network side sending an MBMS suspension indication to a UE and indicating an suspension reason. With the scheme of the present invention, when encountering a sudden service suspension, the user who is receiving the MBMS service obtains a reasonable explanation of the suspended service timely, which greatly reduces a negative influence caused to the satisfaction of the user on the operator service, and better avoids the occurrence of an offline situation of the user. Furthermore, after receiving the MBMS suspension indication, the UE informs the user of the indication through the top stratum signaling. Therefore, it is avoided that a large number of users initiating an access request to the service simultaneously or repeatedly.

18 Claims, 4 Drawing Sheets

(51) Int. Cl.
  *H04W 76/02* (2009.01)
  *H04L 12/18* (2006.01)
  *H04W 72/00* (2009.01)
  *H04W 76/00* (2009.01)
  *H04W 72/12* (2009.01)

(52) U.S. Cl.
  CPC .............. *H04W 4/06* (2013.01); *H04W 72/005* (2013.01); *H04W 76/002* (2013.01); *H04W 72/12* (2013.01); *H04W 76/027* (2013.01)

(56) References Cited

U.S. PATENT DOCUMENTS

2011/0274025 A1* 11/2011 Hsu ............................ 370/312
2012/0163204 A1* 6/2012 Oprescu-Surcobe et al. 370/252

FOREIGN PATENT DOCUMENTS

CN 101677429 A 3/2010
CN 102036177 A 4/2011

OTHER PUBLICATIONS

"Introducing MCE initiated MBMS Session Deactivation"; Orange SA; Discussion and approval; 17; 3GPP TSG-RAN WG3 #71 Feb. 21 to 25, 2011, Taipei, Taiwan; R3-110692; XP50497520A; see pp. 1-4.
3GPP TS 23.246 V10.0.0 (Mar. 2011): 3rd Generation Partnership Project; Technical Specification Group Services and System Aspects; Multimedia Broadcast/Multicast Service(MBMS); Architecture and functional description (Release 10).
International Search Report for PCT/CN2011/079184 dated Jan. 11, 2012.

* cited by examiner

METHOD AND DEVICE FOR INDICATING MBMS SERVICE SUSPENSION, AND USER EQUIPMENT

TECHNICAL FIELD

The present invention relates to the field of multimedia communication, and particularly, to a method and system for indicating service suspension of Multimedia Broadcast Multicast Service (MBMS), and user equipment.

BACKGROUND OF THE RELATED ART

With the rapid development of the Internet and popularity of large-screen multifunction mobile terminals, a large number of mobile data multimedia services and various high bandwidth multimedia services such as video conference, television broadcast, video on demand, advertisement, online education and interactive games and so on appear, which meets the demand of multiple services of mobile users, and also brings new service growth points to mobile operators at the same time. These mobile data multimedia services require that multiple users can receive identical data simultaneously, and when compared with common data services, they have characteristics such as large volume of data, long lasting time and sensitive delay and so on.

In order to use mobile network resources effectively, the 3rd Generation Partnership Project (3GPP) proposes a Multimedia Broadcast Multicast Service (MBMS), the MBMS service is a technology of transmitting data from one data source to multiple destination mobile terminals, which implements the sharing of network (including a core network and an access network) resources, and improves an utilization rate of the network resources (especially the air interface resources). The MBMS service defined in the 3GPP can not only implement multicast and broadcast for plain-text and low-speed messages, but also implement broadcast and multicast for high-speed multimedia services so as to provide various abundant video, audio and multimedia services, which conforms to a development trend of mobile data in the future undoubtedly, and provides a better service prospect for the 3G development.

Currently, the MBMS technology is introduced into the Release 9 Long Term Evolution (LTE) system and is enhanced in Release 10. In the Release 9, control signaling and user data of the MBMS are transmitted separately, which is called as a Control Plane (CP) and a User Plane (UP) respectively. Wherein, the control plane controls the data transmission of the user plane by controlling the start, update and end of the service, and implements the transmission of basic MBMS. The MBMS is transmitted in an MBMS Single Frequency Network (MBSFN) area with a fixed size (which can be configured in a static or semi-static state). In the Release 10, in order to improve a resource utilization rate of an MBMS system and facilitate the operators to manage, the MBMS technology is enhanced. A Counting mechanism and a pre-emption mechanism based on priority are mainly included.

The main principle of the MBMS Counting mechanism is: a network side sending a Counting request message to a User Equipment (UE); the UE in a connected state which is receiving or interested in receiving the MBMS sending a response to the network side, and the network side performs a statistics on the number of corresponding UEs. The main object of introducing the Counting mechanism is to make the operators perform statistics on a receiving state of certain MBMS, recover or suspend an MBSFN transmission mode of the services according to the receiving state, and improves the utilization rate of radio resources.

The main principle of the Pre-emption technology based on a service priority—Allocation and Retention Priority (ARP) is that: when resources are strained, the MBMS service with higher priority can preempt resources of the MBMS with lower priority, and after the resources are preempted by services with higher priority, services with lower priority will be stopped to transmit.

The counting and resource pre-emption are initiated by a Multi-cell/multicast Coordination Entity (MCE), and a scope of the counting and resource pre-emption is generally the MBSFN area. ARP parameters related to the resource pre-emption are from an Evolved Packet Core (EPC), and can be sent from an M3 interface to the MCE through an MBMS session start request message. FIGS. 1(a) and (b) are existing two schemes of the MBMS deployment.

As shown in FIGS. 1(a) and (b), in the MBSFN area, the MCE is responsible for allocating radio resources of the MBMS service, and when a Broadcast-Multicast Service Centre (BM-SC) initiates a new MBMS session start request message, the request message reaches the MCE after going through an MBMS-GW and Mobility Management Entity (MME); if the radio resources do not satisfy a new Quality of service (Qos) requirement, the MCE can suspend the new service session, or, if the priority of the new service session is higher, and the priority of an ongoing MBMS service is lower, the MCE can use the new MBMS service with higher priority to Pre-empt the MBMS service with lower priority according to the ARP parameters (which also can be sent through the MBMS session start request message), which is called as ARP Pre-emption.

In the LTE MBMS technology, the MBMS service is transmitted in the MBSFN area with the fixed size through an enhanced broadcast mode. The MBSFN transmission which is sending the service is suspended, or since the transmission resources are preempted by services with high priority due to the lower priority, the MBSFN transmission of the service will stop transmitting; at the point, the UE which is receiving the service will be unable to continue to receive the service. However, in the existing technology, there is no scheme to inform the UE of the reason why the service has been stopped to transmit. That is to say, users who are receiving the service will encounter a sudden service suspension, and do not get a timely and reasonable explanation, or prompt information. This will cause a larger negative impact on the satisfaction of the users on the service from the operator, and more seriously, may cause the users to be offline. In addition, for the service suspension with an unknown reason, since the users can not distinguish whether the service suspension is a behavior of the network side or a behavior of the UE itself, the users may continually initiate service access, which will cause that a large number of users initiate an access request for the service simultaneously or repeatedly, thereby leading to a network congestion, and influencing the normal service receiving of other users.

SUMMARY OF THE INVENTION

In view of this, the main object of the present invention is to provide a method and system for indicating MBMS suspension, and a user equipment, which can improve the problem that an abrupt suspension of service causes the user experience to decline, avoid a network congestion resulted from a large number of users initiating an access request to the service simultaneously or repeatedly, and enhance service experience of the user and satisfaction on the operator.

In order to solve the above technical problem, the technical scheme of the present invention is implemented as follows.

A method for indicating MBMS suspension comprises: a network side determining an MBMS required to be suspended; and the network side sending an MBMS suspension indication to a User Equipment (UE) and indicating an suspension reason.

The network side determining the MBMS required to be suspended comprises: a Multi-cell/multicast Coordination Entity (MCE) of the network side determining the MBMS required to be suspended and the suspension reason.

The network side sending the MBMS suspension indication to the UE and indicating the suspension reason comprises: the network side selecting an opportunity to send the suspension indication and reason, the opportunity coming from a Minimum Time to MBMS Data Transfer contained in a session request message of a Mobility Management Entity (MME), and the network side sending the suspension indication and suspension reason within the Minimum Time to MBMS Data Transfer.

The network side sending the MBMS suspension indication to the UE and indicating the suspension reason comprises: the MCE of the network side sending the MBMS suspension indication to the UE and indicating the suspension reason via an evolved NodeB (eNB) through an MBMS session update request message or MBMS scheduling information.

The MCE of the network side sending the MBMS suspension indication and indicating the suspension reason through the MBMS session update request message specifically comprises: the MCE of the network side deleting identification of an MBMS session required to be terminated in the MBMS session update request message.

The MCE of the network side sending the MBMS suspension indication and indicating the suspension reason through the MBMS scheduling information comprises: the MCE of the network side deleting an suspended MBMS session in an MBMS session list carried in the MBMS scheduling information.

The network side sending the MBMS suspension indication to the UE and indicating the suspension reason comprises: the MCE of the network side sending indication information for Pre-emption to the MME; and the MME sending the MBMS suspension indication to the UE via the eNB after receiving a Pre-emption indication.

The MME sending the MBMS suspension indication comprises: the MME sending the MBMS suspension indication to the UE via the eNB through a Non-Access-Stratum (NAS) message.

The MCE sending the indication information for Pre-emption to the MME comprises: the MCE carrying the Pre-emption indication through an MBMS session start response message or a dedicated signaling.

The method further comprises: after receiving the MBMS suspension indication, the UE informing a user of the MBMS suspension indication through a top stratum signaling.

A system for indicating MBMS suspension at least comprises: a network side and a UE, wherein, the network side is configured to: determine an MBMS required to be suspended; and send an MBMS suspension indication to the UE and indicate an suspension reason;

the UE is configured to: receive the MBMS suspension indication from the network side, and acquire the suspension reason.

The UE is further configured to: inform a user of the received MBMS suspension indication through a top stratum signaling.

The network side comprises: an MBMS suspension decision unit and an MBMS suspension indication unit, wherein, the MBMS suspension decision unit is configured to: determine the MBMS required to be suspended and the suspension reason, and inform the MBMS suspension indication unit;

the MBMS suspension indication unit is configured to: receive a notification from the MBMS suspension decision unit, send the MBMS suspension indication to the UE and indicate the suspension reason.

The system further comprises an eNB, which is configured to forward signaling between the MBMS suspension indication unit and UE;

when the network side is an MCE, the MBMS suspension decision unit and MBMS suspension indication unit are set in the MCE;

when the network side is an MME, the network side further comprises the MCE at the point, the MBMS suspension decision unit is set in the MCE, and the MBMS suspension indication unit is set in the MME.

The UE is a UE which is receiving the MBMS or interested in receiving the MBMS.

A user equipment is configured to receive an MBMS suspension indication from a network side, and acquire an suspension reason.

The user equipment is further configured to inform a user of the received MBMS suspension indication through a top stratum signaling.

It can be seen from the above technical scheme provided by the present invention that, the scheme includes the network side determining the MBMS required to be suspended, sending the MBMS suspension indication to the UE and indicating the suspension reason. With the scheme of the present invention, when encountering a sudden service suspension, the user who is receiving the MBMS obtains a reasonable explanation of the suspended service timely, which greatly reduces a negative influence caused to the operator service satisfaction for the user, and better avoids the occurrence that the user leaves the network of the operator. Furthermore, after receiving the MBMS suspension indication, the UE informs the user of the indication through the top stratum signaling. Therefore, it is avoided that a large number of users initiating an access request to the service simultaneously or repeatedly, network congestion is prevented, and service experience of the user and satisfaction on the operator are enhanced.

PREFERRED EMBODIMENTS OF THE PRESENT INVENTION

Figure 1A:
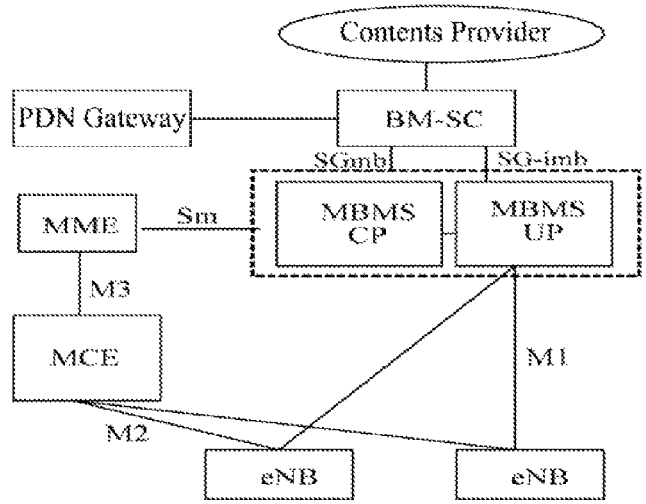
FIG. 1(a) is a schematic diagram of one implementation scheme of the existing eMBMS deployment.
Figure 1B:
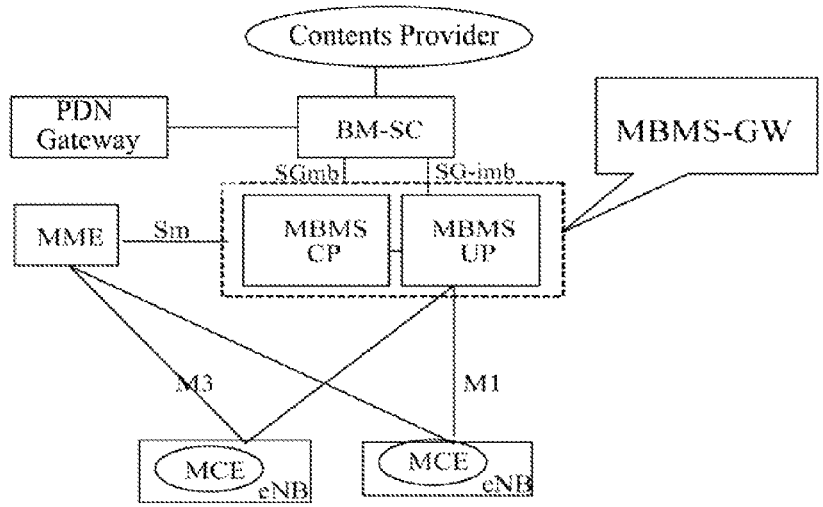
FIG. 1(b) is a schematic diagram of another implementation scheme of the existing eMBMS deployment.
Figure 2:
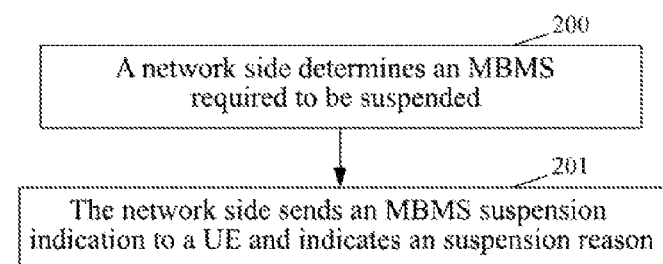
FIG. 2 is a flow diagram of the method for indicating MBMS suspension according to the present invention.

FIG. 2 is a flow diagram of the method for indicating MBMS suspension according to the present invention, and as shown in FIG. 2, following steps are included.

In step 200, a network side determines an MBMS required to be suspended.

In one existing MBMS session start flow, a BM-SC initiates a session start request message, the session start request message reaches an MCE after going through an MBMS-GW and MME, if radio resources satisfy a Qos requirement, the MCE sends the session start request message to all related evolved NodeBs (eNBs) in an MBSFN area so as to establish a corresponding radio bearer for the MBMS; and if the radio resources do not satisfy the Qos requirement and the service priority is higher, the MCE can use the service with higher priority to preempt the radio resources of an ongoing service with lower priority according to the ARP setting.

Wherein, the MCE knows the time required for the process of determining whether to interrupt the MBMS.

In this step, through an Information Element (IE) namely a Minimum Time to MBMS Data Transfer contained in the session start request message from the MME, the MCE can acquire the time from the MCE receiving the session start request message to the BM-SC starting to send service data, that is to say, in this step, it is okay only if the time of determining that a conclusion that MBMS needs to be suspended is got is prior to the time of the BM-SC starting to send the service data.

In step 201, the network side sends an MBMS suspension indication to a UE and indicates an suspension reason.

Specifically, the network side selects an opportunity to send the suspension indication and reason, the opportunity comes from the Minimum Time to MBMS Data Transfer contained in the session request message of the Mobility Management Entity (MME), and the network side sends the suspension indication and suspension reason within the Minimum Time to MBMS Data Transfer. In the step, it can be the MCE of the network side sending the MBMS suspension indication, or the MME of the network side sending the MBMS suspension indication, wherein, (1) the MCE sending the MBMS suspension indication includes that:

no direct signaling interaction exists between the MCE and UE, it is required to perform transmission through the eNB (i.e. an M2 interface), and possible messages include: an MBMS session update request message and MBMS scheduling information. That is, the MCE indicates the MBMS suspension and reason to the eNB through the M2 interface, the eNB forwards the above suspension information to the UE, the eNB can send the MBMS suspension and reason to the UE through a Radio Resource Control (RRC) signaling, and the RRC signaling includes: a system message or an MCCH message; wherein, the object of the MBMS session update request message is to change an MBMS session attribute, such as updating an MBMS area and nodes related to an MBMS control plane and so on. In the MBMS session update request message, a Temporary Mobile Group Identity (TMGI) and an MBMS session identification information element are carried. Therefore, the MCE can use an MBMS session update request to indicate service suspension, for example, an MBMS session ID required to be terminated can be deleted from the MBMS session update request message, and a new MBMS session ID is added, therefore, services sent by the eNB at an air interface do not have the services with the session ID, that is, the service session will be suspended.

The object of the MBMS scheduling information is to send information related to Multicast Control Channel (MCCH), which includes an MBMS session list information element, and the MBMS scheduling information is initiated by the MCE, and is sent before the MBMS data are sent or after the MBMS is stopped, therefore, the MBMS scheduling information can be used to indicate the MBMS suspension. For example, if the MCE decides to Pre-empt a certain MBMS session, the MBMS session will be deleted in the MBMS session list carried in the MBMS scheduling information, therefore, after the eNB receives the MBMS scheduling information, it can be determined that the corresponding MBMS session is suspended, thereby updating MCCH information, and the UE acquires that the MBMS session is suspended due to a network side reason after reading the updated MCCH information.

(2) The MME sending the MBMS suspension indication includes that:

it can be known from the step 200 that, since the Minimum Time to MBMS Data Transfer is sent by the MME to the MCE through an M3 message, the MME also can serve as a network element for indicating the MBMS suspension, which specifically includes:

the MCE sending Pre-emption indication information to the MME; and after receiving the Pre-emption indication, the MME sending the MBMS suspension indication to the UE.

Here, the MME can send the MBMS suspension indication to the UE through a Non-Access-Stratum (NAS) message, wherein, the MME firstly sends the NAS message to the eNB, and then the eNB forwards the NAS message to the UE.

In the method of the present invention, the UE refers to a UE which is receiving the MBMS or interested in receiving the MBMS.

The MBMS suspension reason refers to the network side reason which causes the suspension of the ongoing MBMS. Wherein, the network side reason includes at least one kind of following contents: MBMS suspension caused by the ARP Pre-emption, and MBSFN transmission of the MBMS suspended by the network side and so on.

With the method of the present invention, when encountering a sudden service suspension, the user who is receiving the MBMS obtains a reasonable explanation of the suspended service timely, which greatly reduces a negative influence caused to the operator service satisfaction for the user, and better avoids the occurrence of an offline situation of the user. Particularly, since the radio resources are strained currently, and the priority of the MBMS which the UE is receiving is lower, the sending resources are preempted by the MBMS with higher priority, thereby stopping the sending within the entire scope of MBSFN area of the service. In the condition that the ongoing MBMS is suspended to send due to the reason of other network sides, the MBMS suspension indication also can be sent to the UE. After receiving the MBMS suspension indication sent by the network, the UE can translate the MBMS suspension indication into information that can be understood by the user to display to the user, which avoids a large number of users initiating an access request to the service simultaneously or repeatedly, prevents a network congestion, and enhances service experience of the user and operator satisfaction.

Furthermore, the method of the present invention also includes:

after receiving the MBMS suspension indication, the UE informs the user of the indication through a top stratum signaling. Therefore, it is avoided that a large number of users initiating the access request to the service simultaneously or repeatedly, the network congestion is prevented, and service experience of the user and operator satisfaction are enhanced.

Figure 3:
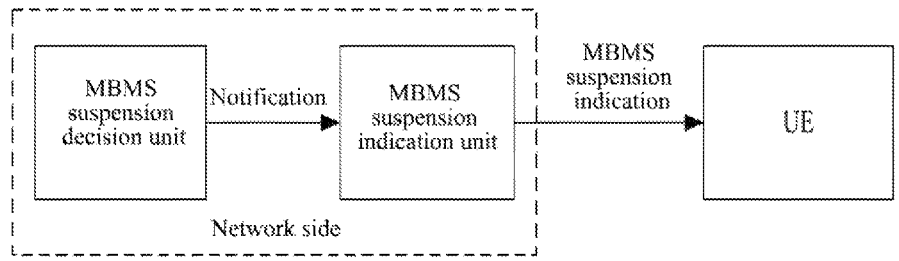
FIG. 3 is a schematic diagram of structure of the system for indicating MBMS suspension according to the present invention.

With respect to the method of the present invention, a system for indicating MBMS suspension is also provided, and as shown in FIG. 3, this system includes at least a network side and a UE, wherein, the network side is configured to: determine an MBMS required to be suspended; and send an MBMS suspension indication to the UE and indicate an suspension reason;

the UE is configured to: receive the MBMS suspension indication from the network side, acquire the suspension reason, and inform a user of the received MBMS suspension indication through a top stratum signaling.

The network side can include: an MBMS suspension decision unit and an MBMS suspension indication unit, wherein, the MBMS suspension decision unit is configured to: determine the MBMS required to be suspended, and inform the MBMS suspension indication unit;

the MBMS suspension indication unit is configured to: receive a notification from the MBMS suspension decision unit, send the MBMS suspension indication to the UE and indicate the suspension reason.

The system also includes an eNB, which is configured to forward signaling between the MBMS suspension indication unit and UE; when the network side is an MCE, the MBMS suspension decision unit and MBMS suspension indication unit are set in the MCE; when the network side is an MME, the MCE is also included at the point, the MBMS suspension decision unit is set in the MCE, and the MBMS suspension indication unit is set in the MME.

The method of the present invention will be described in detail in combination with the examples below.

The First Example

Figure 4:
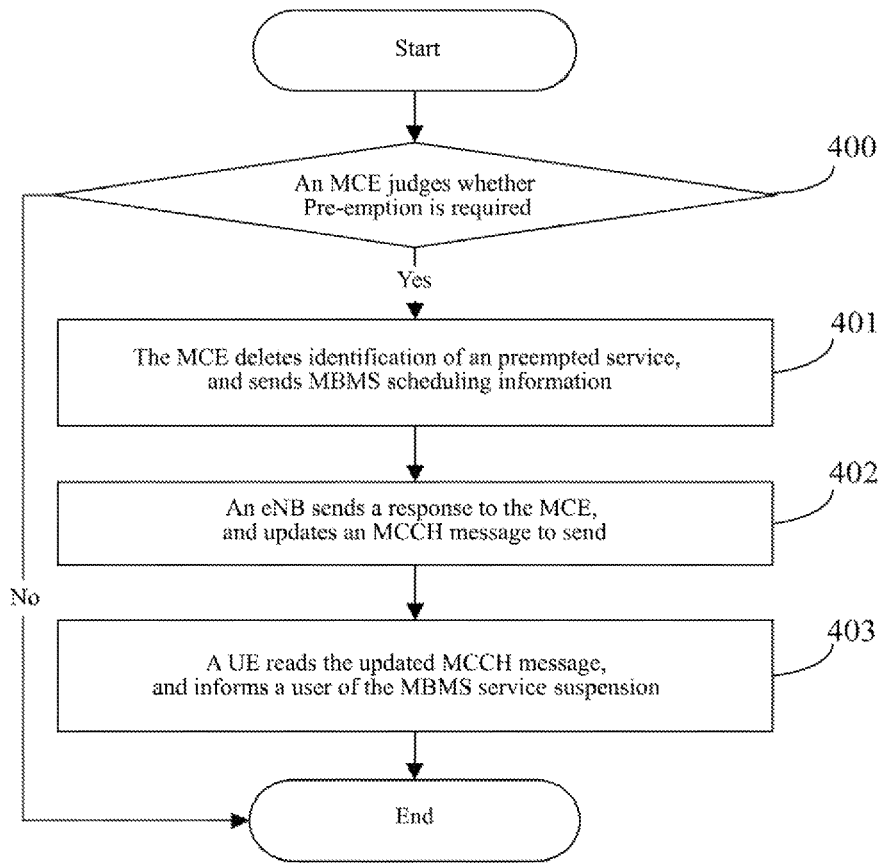
FIG. 4 is a flow diagram of the first example for indicating MBMS suspension according to the present invention.

In the example, MBMS scheduling information is used to indicate MBMS suspension. In order to describe conveniently, only the condition of ARP Pre-emption based on the service priority is discussed in the first example. When more MBMS suspension reasons exist, the skilled in the art know that the same processing can be used. In the present invention, it is only distinguished whether the suspension reason is a behavior of network side or a behavior of UE itself, and with regard to a specific suspension reason caused by the behavior of network side, no distinguishment is made. As shown in FIG. 4, the first example specifically includes following steps.

In step 400, an MCE receives a session start request message, and judges whether the existing MBMS is required to be preempted, if yes, step 401 is entered, and if no, the current flow is ended.

An MME sends the session start request message to the MCE through an M3 interface. After receiving the session start request message, the MCE firstly judges, according to the existing call admission control flow, whether the required resources can be provided, if no, there are two choices: the MCE does not establishes radio bearer resources for a new MBMS session, and sends an MBMS session start failure message to the MME, that is, the session start request flow is suspended; or, the MCE decides to use a new MBMS to Pre-empt an ongoing MBMS, and sends an MBMS session start response message to the MME, wherein, with regard to the ARP Pre-emption, it is required to satisfy that: a priority of the new MBMS is higher than a priority of the ongoing MBMS, and an E-UTRAN can satisfy a QoS requirement of the new MBMS after the Pre-emption. In the step, the requirement of Pre-empting the existing MBMS refers to the condition of the above latter choice.

In step 401, the MCE sends MBMS scheduling information to all eNBs in an MBSFN area within a Minimum Time to MBMS Data Transfer, and deletes a service required to be preempted from an MBMS session list.

The session start request message (or a session update request message) sent by the MME to the MCE carries a Minimum Time to MBMS Data Transfer information element, the time of the information element indicates the time from the MME sending the session start request to a BM-SC sending MBMS data, within this period of time, new MBMS data are not started to send, and the MBMS with low priority is still ongoing. When the MCE decides to preempt resources of the MBMS with low priority, this period of time can be used to send indication information that the MBMS with low priority is suspended.

The MBMS scheduling information is sent before the new MBMS is started or after the MBMS is stopped, therefore, it can be sent within the time indicated by the Minimum Time to MBMS Data Transfer. In the step, identification of the pre-empted service with low priority is deleted in the MBMS session list in the MBMS scheduling information, and the identification of a new MBMS with high priority is added at the same time, so as to indicate that the MBMS suspension reason is caused by the behavior of network side (e.g. the Pre-emption).

In step 402, an eNB receives the MBMS scheduling information, replies an MBMS scheduling information response message to the MCE, and meanwhile updates an MCCH message and send. The specific implementation of the step belongs to the related art, which roughly includes:

the eNB updating the MCCH message according to an MCCH Update time, adding the new MBMS, and deleting the preempted MBMS, a cell belonging to the corresponding MBSFN area in the eNB sending an MCCH change notification message (indicating a new MBMS session start) and the updated MCCH message.

In step 403, a UE which is receiving or interested in receiving the MBMS reads the updated MCCH message. The specific implementation of the step belongs to the related art, which roughly includes:

the UE which is receiving the MBMS reading the MCCH message periodically, and the UE which is interested in receiving the MBMS reading the updated MCCH message after intercepting the MCCH change notification message. The UE determines that the MBMS suspension is the behavior of the network side but not the behavior of the UE itself according to the updated MCCH message. The UE informs an NAS stratum or application stratum of the MBMS suspension through the internal signaling interaction, and since it is the reason of network side, a user will not initiate an MBMS activation request repeatedly.

The Second Example

Figure 5:
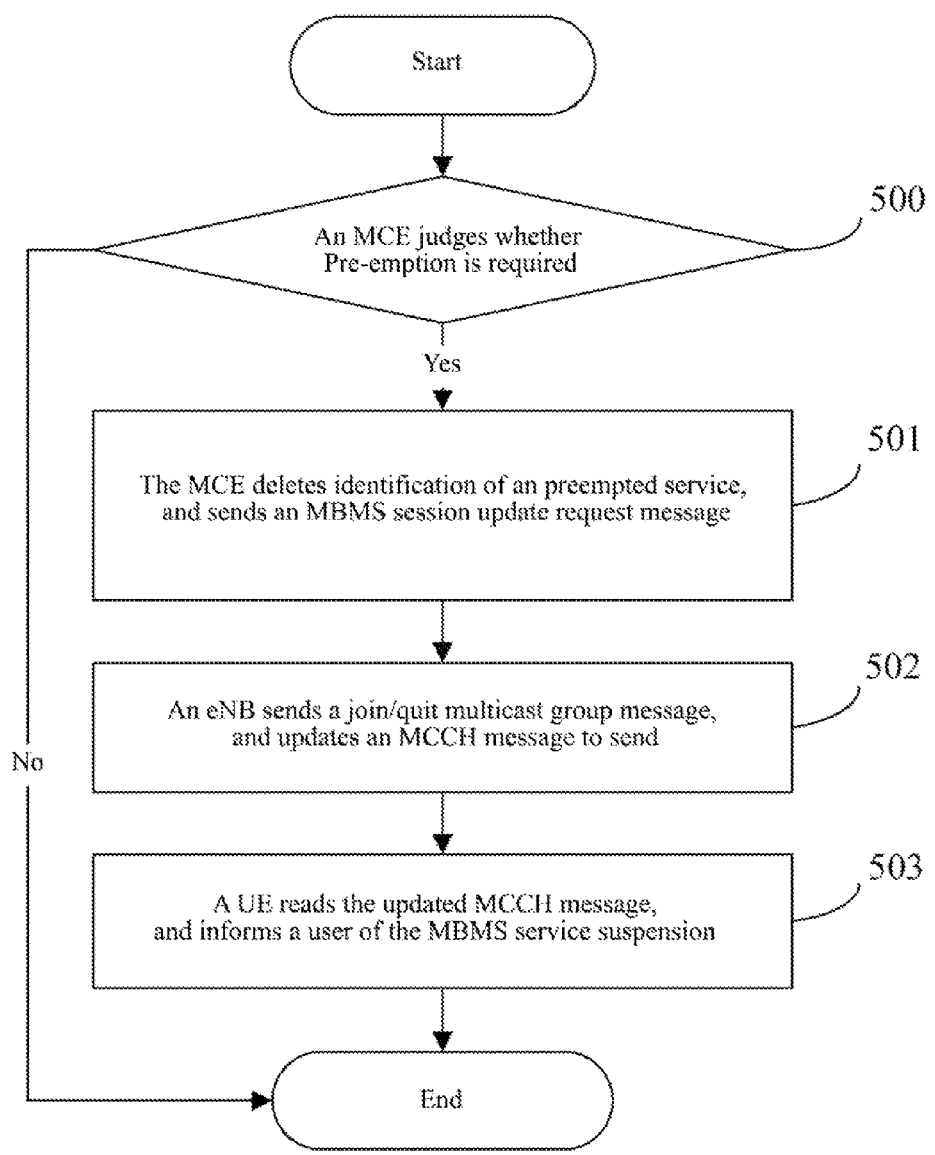
FIG. 5 is a flow diagram of the second example for indicating MBMS suspension according to the present invention.

In the example, an MBMS session update request message is used to indicate MBMS suspension. In order to describe conveniently, only the condition of ARP Pre-emption based on the service priority is discussed in the second example. When more MBMS suspension reasons exist, the skilled in the art know that the same processing can be used. In the present invention, it is only distinguished whether the suspension reason is a behavior of network side or a behavior of UE itself, and with regard to a specific suspension reason caused by the behavior of network side, no distinguishment is made. As shown in FIG. 5, the second example specifically includes following steps.

In step 500, an MCE receives a session start request message, and judges whether the existing MBMS is required to be preempted, if yes, step 501 is entered, and if no, the current flow is ended.

The specific implementation of the step is identical with step 400 completely, which will not be repeated here.

In step 501, the MCE sends an MBMS session update request message to all eNBs in an MBSFN area within a Minimum Time to MBMS Data Transfer, and deletes a TMGI of a service required to be preempted and MBMS session identification.

The session start request message (or a session update request message) sent by an MME to the MCE carries a Minimum Time to MBMS Data Transfer information element, the time of the information element indicates the time from the MME sending the session start request to a BM-SC sending MBMS data, within this period of time, new MBMS data are not started to send, and the MBMS with low priority is still ongoing. When the MCE decides to preempt resources of the MBMS with low priority, this period of time can be used to send indication information that the MBMS with low priority is suspended.

The object of the MBMS session update request message is mainly to change an MBMS session attribute, such as updating an MBMS area and nodes related to an MBMS control plane (such as the MME and MBMS-GW) and so on. In the MBMS session update request message, the TMGI and MBMS session identification information element are carried.

In the step, the MCE deletes the TMGI and session identification required to be terminated from the MBMS session update request message, and meanwhile, it is updated as new MBMS identification with high priority, so as to indicate that the MBMS suspension reason is caused by the behavior of network side (e.g. the Pre-emption). Therefore, what is sent by the eNB at an air interface does not have a corresponding MBMS identification, and it is indicated that the MBMS session will be suspended by the network side.

In step 502, an eNB receives the MBMS session update request message, sends an IP multicast join/quit message to an IP multicast address allocated by the MBMS-GW, and updates an MCCH message to send.

In the related art, after the MBMS session update request message, if a change of the MBMS area is related (e.g. MME is updated), there are generally an MBMS session start request message (sent to a new control plane node) and an MBMS session stop request message (sent to an original control plane node).

In the example, the MBMS identity in the MBMS session update request message is changed in step 501, that is, a new session start exists, thus, the eNB updates the MCCH message of related cells, adds a new MBMS identity, and deletes the preempted MBMS identity, a cell belonging to the corresponding MBSFN area in the eNB sends an MCCH change notification message (indicating a new MBMS session start) and the updated MCCH message.

In step 503, a UE which is receiving or interested in receiving the MBMS reads the updated MCCH message. The specific implementation of the step belongs to the related art, which roughly includes:

the UE which is receiving the MBMS reading the MCCH message periodically, and the UE which is interested in receiving the MBMS reading the updated MCCH message after intercepting the MCCH change notification message. The UE determines that the MBMS suspension is the behavior of network side but not the behavior of UE itself according to the updated MCCH message. The UE informs an NAS stratum or application stratum of the MBMS suspension through the internal signaling interaction, and since it is the reason of network side, a user will not initiate an MBMS activation request repeatedly.

The Third Example

Figure 6:
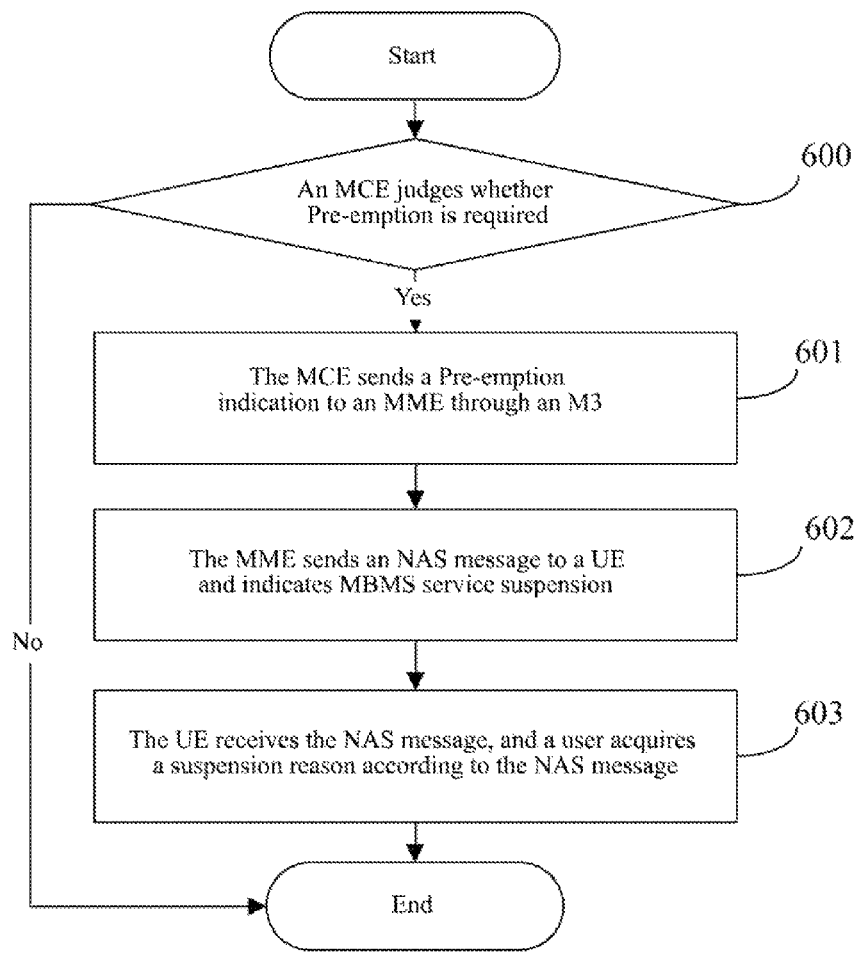
FIG. 6 is a flow diagram of the third example for indicating MBMS suspension according to the present invention.

In the example, an NAS signaling is used to indicate MBMS suspension, and as shown in FIG. 6, following steps are included.

In step 600, an MCE receives an MBMS session start request message, and judges whether the existing MBMS is required to be preempted, if yes, step 601 is entered, and if no, the current flow is ended.

The specific implementation of the step is identical with step 400 completely, which will not be repeated here.

In step 601, the MCE sends a Pre-emption indication to an MME which sends the MBMS session start request message in step 600. The specific implementation of the step specifically includes:

the MCE carrying the Pre-emption indication through an MBMS session start response message, for example, an information element is newly added in the MBMS session start response message to indicate an preempted service identity, and the service identity can be any one of the following contents: an MBMS ID, an MBMS index and an MBMS bitmap; or the MCE sending the Pre-emption indication to the MME through a dedicated signaling, and the dedicated signaling can be a new M3 signaling, such as an MBMS Pre-emption indication.

In step 602, the MME sends an NAS signaling within a Minimum Time to MBMS Data Transfer, and indicates an MBMS suspension reason.

In the step, if the MME knows the configuration of an MBSFN area, the MME sends an NAS message to all UEs in the MBSFN area, and indicates that the MBMS suspension reason is ARP Pre-emption; if the MME does not know the configuration of the MBSFN area, the MME sends the NAS message to all UEs in an MBMS Area (SA) or Tracking Area (TA), and indicates that the MBMS suspension reason is the ARP Pre-emption.

In step 603, the UEs receive the NAS signaling, and a user acquires the current service suspension reason according to the NAS signaling.

After the user knows the service suspension reason, it can stop receiving the service or continue to receive the service in other ways, such as in a unicast mode.

The above description is only the preferred examples of the present invention, which is not used to limit the protection scope of the present invention. All the modifications, equivalent substitutions, and improvements, etc. made within the spirit and principle of the present invention shall fall into the protection scope of the present invention.

What is claimed is:

1. A method for indicating suspension of Multimedia Broadcast Multicast Service (MBMS), comprising:
a network side determining an MBMS required to be suspended;
the network side sending an MBMS suspension indication to a User Equipment (UE) and indicating an suspension reason;
the network side selecting an opportunity to send the suspension indication and reason, wherein, the opportunity is from a Minimum Time to MBMS Data Transfer contained in a session request message of a Mobility Management Entity (MME); the network side sending the suspension indication and suspension reason in the Minimum Time to MBMS Data Transfer;

wherein the network side comprises a Multi-cell/multicast Coordination Entity (MCE) and the MCE determines the MBMS required to be suspended and the suspension reason.

2. The method according to claim 1, wherein, the network side sending the MBMS suspension indication to the UE and indicating the suspension reason comprises:
the MCE of the network side sending the MBMS suspension indication to the UE and indicating the suspension reason via an evolved NodeB (eNB) through an MBMS session update request message or MBMS scheduling information.

3. The method according to claim 2, wherein, the MCE of the network side sending the MBMS suspension indication and indicating the suspension reason through the MBMS session update request message specifically comprises:
the MCE of the network side deleting identification of an MBMS session required to be terminated in the MBMS session update request message.

4. The method according to claim 2, wherein, the MCE of the network side sending the MBMS suspension indication and indicating the suspension reason through the MBMS scheduling information comprises:
the MCE of the network side deleting an suspended MBMS session in an MBMS session list carried in the MBMS scheduling information.

5. The method according to claim 1, wherein, the network side sending the MBMS suspension indication to the UE and indicating the suspension reason comprises:
the MCE of the network side sending indication information for Pre-emption to the MME; and the MME sending the MBMS suspension indication to the UE via the eNB after receiving a Pre-emption indication.

6. The method according to claim 5, wherein, the MME sending the MBMS suspension indication comprises:
the MME sending the MBMS suspension indication to the UE via the eNB through a Non-Access-Stratum (NAS) message.

7. The method according to claim 6, wherein, the MCE sending the indication information for Pre-emption to the MME comprises:
the MCE carrying the Pre-emption indication through an MBMS session start response message or a dedicated signaling.

8. The method according to claim 1, further comprising:
after receiving the MBMS suspension indication, the UE informing a user of the MBMS suspension indication through a top stratum signaling.

9. The method according to claim 1, further comprising:
after receiving the MBMS suspension indication, the UE informing a user of the MBMS suspension indication through a top stratum signaling.

10. A system for indicating suspension of Multimedia Broadcast Multicast Service (MBMS), comprising at least: a network side and a UE, wherein,
the network side is configured to: determine an MBMS required to be suspended; and send an MBMS suspension indication to the UE and indicate an suspension reason;
the network side is further configured to send the suspension indication and suspension reason in the Minimum Time to MBMS Data Transfer;
the UE is configured to: receive the MBMS suspension indication from the network side, and acquire the suspension reason;
wherein the network side comprises an Multi-cell/multicast Coordination Entity (MCE), and the MCE determines the MBMS required to be suspended and the suspension reason.

11. The system according to claim 10, wherein, the UE is further configured to: inform a user of the received MBMS suspension indication through a top stratum signaling.

12. The system according to claim 11, wherein, the network side comprises: an MBMS suspension decision unit and an MBMS suspension indication unit, wherein,
the MBMS suspension decision unit is to: determine the MBMS required to be suspended and the suspension reason, and inform the MBMS suspension indication unit;
the MBMS suspension indication unit is to: receive a notification from the MBMS suspension decision unit, send the MBMS suspension indication to the UE and indicate the suspension reason.

13. The system according to claim 12, wherein, the system further comprises an eNB, which is to forward signaling between the MBMS suspension indication unit and the UE;
the network side is an MCE; the MBMS suspension decision unit and MBMS suspension indication unit are set in the MCE; or the network side is comprises an MME; and an MCE; the MBMS suspension decision unit is set in the MCE, and the MBMS suspension indication unit is set in the MME.

14. The system according to claim 10, wherein, the network side comprises: an MBMS suspension decision unit and an MBMS suspension indication unit, wherein, the MBMS suspension decision unit is to: determine the MBMS required to be suspended and the suspension reason, and inform the MBMS suspension indication unit; the MBMS suspension indication unit is to: receive a notification from the MBMS suspension decision unit, send the MBMS suspension indication to the UE and indicate the suspension reason.

15. The system according to claim 14, wherein, the system further comprises an eNB, which is to forward signaling between the MBMS suspension indication unit and the UE; the network side is an MCE; the MBMS suspension decision unit and MBMS suspension indication unit are set in the MCE; or, the network side is comprises an MME; and an MCE the MBMS suspension decision unit is set in the MCE, and the MBMS suspension indication unit is set in the MME.

16. The system according to claim 10, wherein, the UE is a UE which is receiving the MBMS or interested in receiving the MBMS.

17. A user equipment, comprising to: a processor; wherein the user equipment is to receive an MBMS suspension indication from a network side, and acquire an suspension reason;
wherein the MBMS suspension indication and suspension reason is sent to an eNB in which the user equipment locates by an Multi-cell/multicast Coordination Entity (MCE) in a Minimum Time to MBMS Data Transfer, and the eNB inform the user equipment through an updated MCCH message.

18. The user equipment according to claim 17, wherein, the user equipment is further to: inform a user of the received MBMS suspension indication through a top stratum signaling.

* * * * *